HALL EFFECT DEVICE HAVING ANISOTROPIC LEAD CONDUCTORS

Filed April 6, 1960 2 Sheets-Sheet 1

INVENTOR
GOTTFRIED ARLT
BY Frank R. Jerifari
AGENT

INVENTOR
GOTTFRIED ARLT
BY
[signature]
AGENT

United States Patent Office 3,197,651 Patented July 27, 1965

3,197,651

HALL EFFECT DEVICE HAVING ANISOTROPIC LEAD CONDUCTORS

Gottfried Arlt, Aachen, Germany, assignor to North American Philips Company, Inc., New York, N.Y., a corporation of Delaware Filed Apr. 6, 1960, Ser. No. 20,284
Claims priority, application Germany Apr. 9, 1959
3 Claims. (Cl. 307—88.5)

This invention relates to an electircal transmission device comprising a thin body made of semi-conductor material having a high carrier mobility. The body is arranged in a magnetic field having a component at right angles to the main surface of the thin body, and is provided with at least one pair of electrodes.

Such devices are known and are usually referred to as Hall generators, Hall gyrators, Hall circulators, Hall isolators or Hall quadripoles. The short-circuiting influence of the electrodes on the Hall voltages and control voltages produced in the proximity of these electrodes gives rise to power losses in the semi-conductor body which restrict the transmission efficiency. The efficiency $\eta$ attainable with the known Hall generators, which is defined as the ratio of the power to be taken from the semi-conductor body to the power flowing into the body, is $\eta=0.172$ and is only attained when the product of the carrier mobility and the magnetic induction exceeds all limits.

It is an object of the present invention materially to improve the efficiency of a transmission device which is based on the Hall effect. It consists in that the short-circuiting action of the electrodes is largely eliminated by designing these electrodes so that the undesirable currents in the proximity of the electrodes are avoided or reduced by a high impedance across the electrodes, whereas the desired currents can flow substantially unimpededly. This improvementt is obtainable owing to the fact that the electrodes and the leads connected thereto have anisotropic conductivity properties so that the impedance between two points of an electrode is very high except across the semi-conductor body, or that the electrodes and leads are artificially approximately anisotropic in that at least one of these electrodes is split into at least two electrode parts connected to separate lead parts, or that a pair of electrodes and the leads connected thereto are replaced by an anisotropically acting inductive coupling.

The invention will now be described more fully with reference to the drawings.

Figure 16:
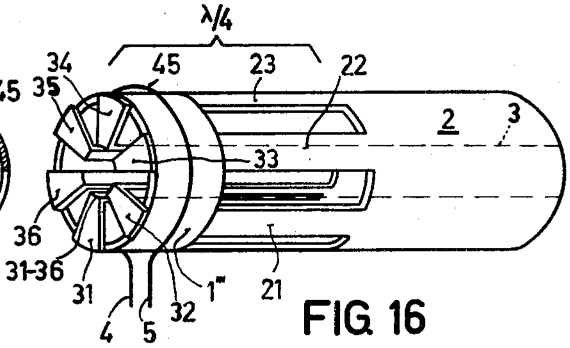
Figure 17:
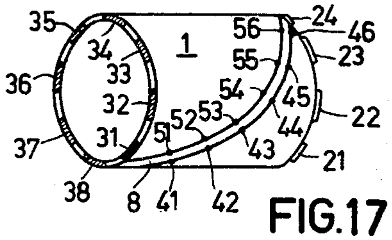

FIGS. 16 and 17 finally show further embodiments for the transmission of very high frequencies.

Figure 1:
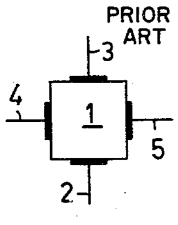
FIG. 1 shows a thin wafer of semi-conductor material having a high carrier mobility, which wafer is provided with two pairs of electrodes along its edges, in a conventional embodiment.

FIG. 1 shows diagrammatically a thin quadratic semiconductor body 1 having a high carrier mobility, which may be made of indium antimonite, indium arsenite, bismuth telluride or mercury selenide. The body is arranged in a magnetic field which preferably extends at right angles to the main plane of the body and is not shown in the figure for the sake of simplicity. The body is provided with two pairs of edge electrodes 2, 3 and 4, 5, respectively.

If, for example, an electric current flows between the electrodes 2 and 3, due to the action of the magnetic field on this current there is produced a Hall voltage between the two other electrodes 4 and 5. This known so-called Hall effect is used for the electric transmission of currents. It is known that such a transmission device has gyrator properties and in combination with resistors connected, for example, between the electrodes 2 and 4 becomes an isolator, that is to say a transmission device which does not pass the flow of energy in one direction but passes it in the other direction. As a gyrator, the attenuation of the energy flow from the pair of terminals 2, 3 to the pair of terminals 4, 5 or conversely always exceeds 7.6 db. Part of this attenuation is due to the fact that in the proximity of the input electrodes the current lines are distorted so as to give rise to higher losses. This distortion and the losses can be partially explained as being due to circulating currents in the proximity of the input electrodes which are produced by the Hall field strength in the wafer and are short-circuited through the electrodes. In other words, if a voltage is applied between electrodes 4 and 5, and a magnetic field is applied perpendicular to the wafer, a Hall voltage will appear between the electrodes 2 and 3. This Hall voltage is composed of a great number of subvoltages originating in parallel strips which extend between the electrodes 4 and 5. In the portions of these strips near the electrodes 4 and 5, the electrodes 4 and 5 short-circut the strips, thereby creating circulating currents.

Figure 2:
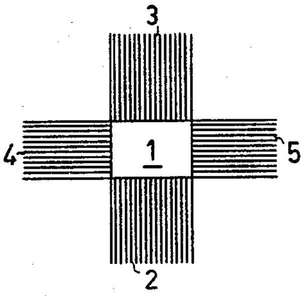
FIG. 2 shows a similar wafer in which, in accordance with the invention, the compact metallic electrodes are replaced by supply leads provided at the edges of the wafer, which leads have a considerable conductivity in a direction at right angles to the contact surface, but an insignificant conductivity in a direction parallel to the contact surface.
Figure 3:
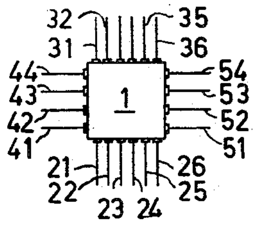
FIG. 3 shows another semi-conductor wafer in which the supply leads having anisotropic conductivity of FIG. 2 are replaced by a finite number of lead parts and electrode parts.

FIG. 2 or 3 in combination with FIGS. 4 and 5 or 6 and 7 illustrate the principle of the transmission device in accordance with the present invention.

FIG. 2 shows a rectangular wafer 1 of semi-conductor material, a magnetic field (not shown) being provided preferably at right angles to the wafer. Instead of the compact metal electrodes of FIG. 1, tapes 2, 3, 4, 5 having anisotropic conductivity properties are connected to the wafer 1. The tapes must have a satisfactory electrical conductivity in their direction of length but a slight or hardly any conductivity in the transverse direction. Such materials are known. For example, bismuth telluride owing to its layer structure has a satisfactory conductivity along the layers but a very low conductivity at right angles to the planes of the layers. Such materials can be built artificially by uniting mutually insulated bundles of wires to form a tape.

Figure 6:
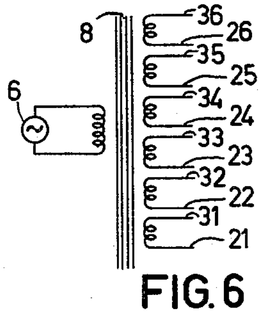
FIGS. 6 and 7 show the connection of the electrode pairs of FIG. 3, which are split into electrode parts and lead parts, to a signal source and a load by means of transformers and, in combination with FIG. 3, show a further embodiment.
Figure 7:
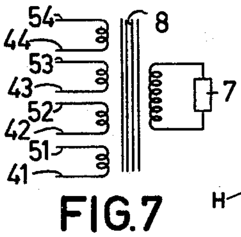

FIG. 3 shows an example in which a tape 2, 3 is made up of two sets of 6 wires 21–26 and 31–36 each, while the tape 4, 5 comprises two sets of 4 wires 41–44 and 51–54 each. The contacts between the wafer and the tapes must be such that at the contact points there is no appreciable conductivity bridge between the individual current wires of the tapes except across the Hall wafer itself. By the use of such electrodes and supply conductors, the losses due to the circulating currents near the compact electrodes mentioned hereinbefore with reference to FIG. 1 are eliminated. In addition, no short-circuiting connections between the individual conductor wires must be provided in the further parts of the tapes. As is shown schematically in FIGS. 4 and 5 for the anisotropic tapes of FIG. 2, they can be coupled for this purpose to the signal source 6 and to the load 7 by means of two transformers each having a ferromagnetic core 8. FIGS. 6 and 7 also show schematically two transformers, one for each of the artificially anisotropic conductivity tapes of FIG. 3, which transformers comprise ferromagnetic cores 8 and six and four parallel-connected windings respectively, to which the individual wires of the tapes 21–26, 31–36 and 41–44, 51–54 respectively are connected. A further winding of each transformer again serves to provide a connection to a supply source 6 and a load 7 respectively.

The principal advantage of the invention consists in that by means of such anisotropic conductivity tapes the above defined electric efficiency of the energy transmission can be materially improved. While the highest possible efficiency for the known gyrator as shown in FIG. 1 is $\eta_{max}=0.172$, the highest possible efficiency of the gyrator comprising ideally anisotropic tapes in accordance with the diagram of FIG. 2 is $\eta_{max}=1$ and the highest possible efficiency using artificially anisotropic tapes will be $$\eta_{max.}=\frac{\sqrt{mn+1}-1}{\sqrt{mn+1}+1}$$

where $m$ and $n$ are the numbers of wires of the respective bundle pairs. In the example of FIG. 3, $m=6$ and $n=4$ and hence $\eta_{max}=0.66$. In contradistinction to the example of FIG. 2, in which the tapes can be assumed to be ideally anisotropic, the replacement of the anisotropic conductivity tapes by wire bundles of the kind shown in FIG. 3 must be referred to as artificially or nearly or approximately anisotropic. This approximation begins by the bundle comprising at least two wires. Alternatively it might be said that in the approximately anisotropic conductivity tapes the compact electrodes of FIG. 1 are divided into at least 2 electrode parts, each electrode part being connected, in accordance with the group to which it belongs, through a lead part or an artificially anisotropic lead to a supply circuit and a load circuit respectively.

Figure 4:
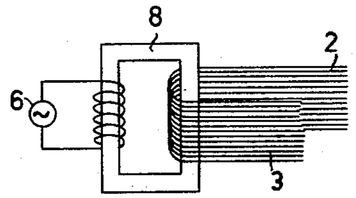
FIGS. 4 and 5 show the transition from the anisotropic tape-shaped supply leads of FIG. 2 to a voltage source and a load resistance by means of transformers and together with FIG. 2 show a first embodiment of the electrical transmission device in accordance with the invention.
Figure 5:
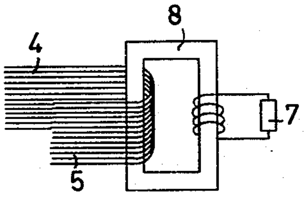
Figure 8:
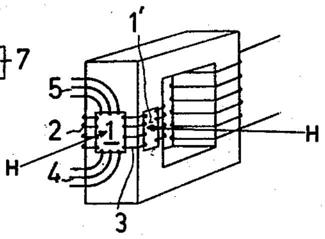
FIG. 8 shows a modification of the embodiment of FIGS. 2, 4 and 5.

FIG. 8 shows a modification of the device shown in FIGS. 2, 4 and 5, in which the wafer 1 is directly laid on the transformer core. This arrangement has the advantage that the ferromagnetic core of the transformer may be employed as in FIGS. 4 and 5 to couple signals to and from the wafer, and also as a part of the magnetic circuit to produce the magnetic field required to provide the Hall effect. Further Hall wafers can be connected in series in the anisotropic or nearly anisotropic conductivity tapes. As is shown in FIG. 8, a number of such wafers, for example a wafer 1' also, are connected about the transformer core in series by anisotropic or approximately anisotropic leads. It must be ensured that all these wafers are traversed by a magnetic field substantially at right angles to their main planes, as shown by the arrows H in FIG. 8.

Figure 9:
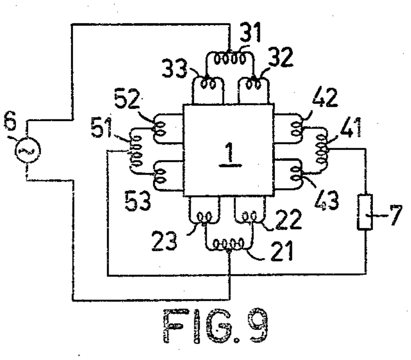
FIGS. 9 and 10 show modifications of the second embodiment.
Figure 10:
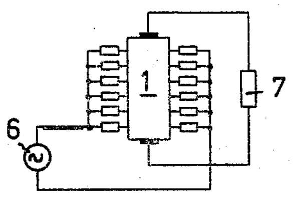

FIGS. 9 and 10 show schematically a different manner of connecting the electrode parts of the nearly anisotropic tapes to signal source and load. In FIG. 9, the transformers of FIGS. 6 and 7 are replaced by inductances 21–23, 31–33, 41–43 and 51–53 which decouple the electrode parts for alternating currents, but pass the signals from the signal source 6 or to the load 7 unimpededly.

In the modification shown in FIG. 10, the electrode parts of the energizing circuit are decoupled by means of ohmic resistances which must exceed the ohmic resistance between any 2 electrode parts of an edge, the load circuit being provided with compact electrodes in known manner. As compared with the above-mentioned decoupling methods by means of transformers or inductances, this circuit arrangement has the advantage that it is also capable of transmitting a direct-current component. The disadvantage of the ohmic losses in the resistances is insignificant in the cases where a maximum Hall power must be produced in the load 7 by means of a Hall wafer 1 which is as small as possible.

Figure 11:
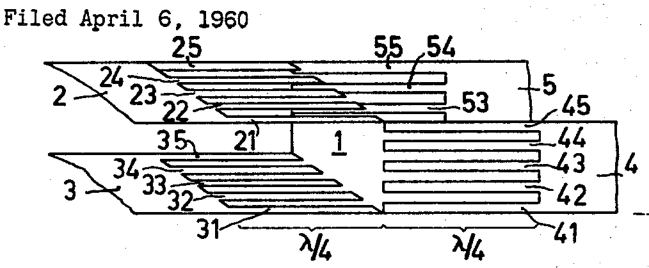
FIG. 11 shows a further embodiment for the transmission of very high frequencies.

FIG. 11 shows a further embodiment of the transmission device in accordance with the invention. This again comprises a rectangular Hall wafer 1 which is traversed at right angles by a magnetic field (not shown). Input and output circuits are constituted by two high-frequency tape leads 2, 3 and 4, 5. If, now, the tape leads are slit through a distance of $\lambda/4$ measured from the wafer, so that in the vicinity of the wafer each tape comprises a number of parallel arranged lead parts 21–25, 31–35 and 41–45, 51–55, each lead part being separately connected to the wafer in the manner shown in FIG. 3, the entire arrangement again has the nature of an approximate anisotropy of the supply leads and electrodes, while the lead parts are decoupled by the $\lambda/4$ slits for the frequency at which the slits have a length of about $\lambda/4$. Viewed from the wafer, for this frequency the impedance between the ends of two lead parts of a tape in theory is infinitely large.

All the transmission devices described hereinbefore are gyrators or Hall generators. The connections of the signal source and the load can always be interchanged. This interchange provides only a phase shift of 180° between the input and the output. Such transmission devices can also be used as gate circuits or as modulators: by interrupting the magnetic flux passing at right angles through the wafer 1, the transmission is interrupted in both directions, and by variation of the magnetic flux the electric currents in the output of the transmission device are modulated accordingly.

Figure 12:
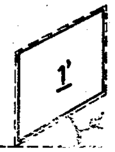
FIG. 12 shows a modification of the embodiment of FIG. 11.

FIG. 12 shows a modification of the high-frequency embodiment of FIG. 11. A wafer 1' made of semi-conductor material here is not rectangular but has the shape of a parallelogram. It is again traversed by a magnetic field component (not shown) at right angles to its main plane.

To the edges of this parallellogram-shaped wafer 1' there are connected, in a manner identical to that shown in FIG. 11, tape leads slit through a length of $\lambda/4$, which leads also have parallellogram-shaped cross-sections, at least in the proximity of the wafer. Each angle of the parallellogram of the wafer differs by value $\alpha$. If $\tan \alpha$ is made equal to the product $\mu B$ of the carrier mobility and the magnetic induction at right angles to the wafer 1', the transmission device has the property of passing the electric signals highly attenuated in the one direction and completely blocking signals in the other direction. Thus, the device is a unilateral conductor or a uniline.

Figure 13:
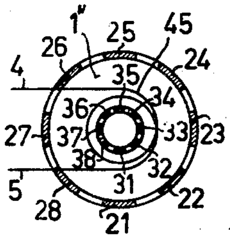
FIGS. 13 and 14 show another embodiment for the transmission of very high frequencies.
Figure 14:
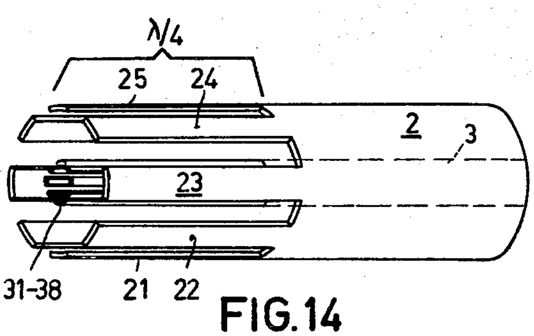

FIGS. 13 and 14 show a further embodiment of the device in accordance with the invention for high-frequency applications. It comprises a thin annular disc 1'' made of semi-conductor material which at the outer and inner circumferences is provided with a number of electrode parts 21–28 and 31–38 respectively, which are connected to the outer and inner conductors 21–28 and 31–38 of a coaxial cable shown in FIG. 14, the latter conductors being slit through a length of $\lambda/4$. This slitting again has the same object of producing approximate anisotropy and of decoupling the electrode parts similarly to the embodiment of FIG. 11 in which tape leads are used. Owing to the action of the magnetic field component (not shown) traversing the wafer 1'' at right angles, circulating currents are produced in the disc just as in a Corbino disc, which currents can be coupled out inductively from the disc to a parallel wire lead 4, 5 by means of a coupling loop 45. Such an inductive coupling device acts as an ideally anisotropic electrode pair. This may readily be appreciated from FIG. 8 by replacing the tapes 2, 3 by a cylindrical Hall wafer entirely surrounding the transformer core. Hence, this embodiment shown in FIGS. 13 and 14 is highly suited as a transition device between a coaxial line and a symmetrical line. It has gyratorical properties. Input and output can be interchanged. As has been mentioned hereinbefore, the device can also be used as a gate circuit or as a modulating circuit.

Figure 15:
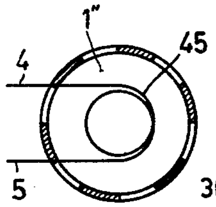
FIG. 15 shows a modification of the embodiment of FIGS. 13 and 14.

FIG. 15 shows a modification of the embodiment of FIGS. 13 and 14. In this modification, the outer edge of the disc-shaped Hall wafer 1'' is again provided with electrode parts 21—29, the inner edge being contracted to form a central contact of not too large a radial size. The coaxial cable connected to the device has a slit outer conductor and a non-slit inner conductor. Coupling out and coupling in are again effected by means of an inductive coupling loop similarly to FIG. 13.

FIG. 16 shows a further embodiment of the transmission device in accordance with the invention, which is also suited for high-frequency applications. As the Hall wafer, use is made of a thin hollow cylinder 1''' of semiconductor material. This cylinder must again be traversed at right angles to its main plane by a magnetic field component and consequently a radially directed magnetic field is used, which is not shown for the sake of simplicity. The cylinder must be short in length compared to the wavelength. The hollow cylinder is slipped into the outer conductor 2 of a coaxial cable. Similarly to FIG. 14, both the outer conductor 2 and the inner conductor 3 of the coaxial cable are slit through a length of $\lambda/4$ starting from the Hall wafer, so that lead parts 21–28 are produced on the outside and lead parts 31–36 on the inside. These lead parts are each electrically connected to a corresponding number of electrode parts provided on the annular end faces of the cylinder. The inner conductor is connected to the partial electrodes of the wafer 1''' by means of spoke-shaped connections 91–96, while the lead parts of the outer conductor are electrically connected to the electrode parts of the other endface. The currents axially flowing through the wafer again produce together with the radial magnetic field (not shown) circulating currents in the cylinder, which can be coupled out therefrom by means of a coupling loop 45 in combination with a parallel wire lead 4, 5. This device also is highly suited for symmetry devices and furthermore has gyratorical properties. It can also be used as a gate circuit or modulating circuit.

In a modification of this embodiment of FIG. 16 which is not shown, the slits of the outer conductor of the coaxial cable extend through the cylindrical wafer so that each partial conductor of the outer conductor is connected through a rectangular Hall wafer and through a spoke to a corresponding lead part of the inner conductor. Thus, the Hall cylinder is divided into rectangular Hall wafers which can be manufactured by a simple technique. In order to enable circulating currents to flow, anisotropic or approximately anisotropic connections are provided between the individual Hall wafers so that the assembly can be considered as a series circuit similarly to the Hall wafers 1, 1' and the leads 2 and 3 of FIG. 8.

If, for example for reasons connected with a particular circuit arrangement, the inductive coupling of the parallel wire lead must be avoided, the hollow cylinder of FIG. 16 can be provided with one slit extending throughout its length, an approximately anisotropic tape lead, which may have been rendered approximately anisotropic by slitting through a length of $\lambda/4$, being connected to the edges of the first-mentioned slit through electrode parts. In the last-mentioned modification of FIG. 16, this corresponds to a division of the nearly anisotropic connection between two strips of semi-conductor material with a corresponding connection of a slit tape lead.

FIG. 17 shows a modification of the embodiment of FIG. 16, in which a hollow cylinder 1''' is again slit once in order to replace the inductive coupling by the direct connection of an approximately anisotropic parallel tape lead. In this modification, however, the slit 8 does not extend axially but helically so that in a developed view of the hollow cylinder one would see a parallellogram the angles of which differ from right angles by a value $\alpha$. If both edges of the slit are provided with electrode parts 41–46 and 51–56 and these electrodes are again connected to a tape lead slit through a length of $\lambda/4$ to form a corresponding number of lead parts, the transmission device has unilateral properties similarly to the modification shown in FIG. 12. To this end, the radial component of the magnetic field must be chosen so that $\tan \alpha$ is equal to the product $\mu B$ of the carrier mobility and the magnetic induction. Such unilateral quadripoles are used for coupling antennas in a reaction-free manner to a transmitter or an amplifier. The device described also has the advantage that it is capable of providing the transition from a symmetrical conductor to a coaxial cable and conversely.

The wafer 1'' of the embodiment shown in FIGS. 13 and 14 or in the modification of FIG. 15 can similarly be slit radially, both edges of the slit being provided with electrode parts connected to corresponding lead parts of an approximately anisotropic tape conductor. Instead of radial, this slit might be helical with a pitch angle differing from a right angle by a value $\alpha$. If $\tan \alpha$ is equal to the product $\mu B$ of the carrier mobility and the magnetic induction of the axial field component, a unilateral conductor is again obtained.

In many cases, for example in impedance transformers in antenna leads and so on, a lead or a branch of a lead must be terminated by a determined, preferably adjustable impedance. The transmission device can be of advantage for such uses also. In this application, the semiconductor body itself forms the terminating impedance and the value of this impedance is adjustable by variation of the magnetic field component at right angles to the main plane of the semi-conductor body. Obviously, in this event, the output tape lead 4, 5 of FIG. 15 or the coupling loop 45 of FIG. 13, 15 or 16 is omitted.

All the embodiments described have the advantage of a higher energetic efficiency of the transmission owing to the compact metal electrodes of FIG. 1 being split into anisotropic or approximately anisotropic electrodes and supply leads.

Furthermore, it should be mentioned that in order further to increase the efficiency, the semi-conductor body or the entire transmission device can be maintained at a low temperature.

What is claimed is:

1. An electric transmission device comprising a thin body of a semiconductive material having a high carrier mobility, means providing a magnetic field having a component normal to the main surface of said body, a transformer having a primary winding and a plurality of secondary windings, a source of signals, means for applying said signals to said primary winding, substantially separate conducting means connecting each of said secondary windings to spaced apart points on a pair of opposite continuous, uninterrupted edges of said body, and means for deriving a Hall voltage from said body.

2. An electric transmission device comprising a thin parallelogram shaped body of semiconductive material having a high carrier mobility, means providing a magnetic field having a component normal to the main surface of said body, a plurality of spaced apart electrodes on a pair of opposite edges of said body, a source of signals having a pair of terminals, anisotropic conducting means connected between each of said terminals and the electrodes of said pair of opposite continuous, uninterrupted edges of said body whereby the impedance of said conducting means between adjacent electrodes is greater than the impedance of said body between said adjacent electrodes, and means for deriving a Hall voltage from said body.

3. An electric transmission device comprising a thin parallelogram-shaped body of semiconductive material having a high carrier mobility, the edges of said body being continuous and uninterrupted, means providing a magnetic field having a component normal to the main surface of said body, a first plurality of spaced apart electrodes on a first pair of opposite edges of said body, a second plurality of spaced apart electrodes on the remaining edges of said body, a source of signals, first anisotropic conducting means connected to couple said signals to said first spaced apart electrodes whereby the impedance of said first conducting means between adjacent electrodes is greater than the impedance of said body between said adjacent first electrodes, output means, and second anisotropic conducting means connected to couple Hall voltages at said second electrodes to said output means, whereby the impedance of said second conducting means between adjacent second electrodes is greater than the impedance of said body between said adjacent second electrodes.

References Cited by the Examiner

UNITED STATES PATENTS

| | | | |
|---|---|---|---|
| 1,170,811 | 2/16 | Hay et al. | 174—32 |
| 1,778,795 | 10/30 | Craig | 324—45 |
| 1,822,129 | 9/31 | Craig | 330—6 |
| 2,616,074 | 10/52 | McCreary | 324—45 |
| 2,619,627 | 11/52 | Slepian | 324—45 |
| 2,852,732 | 9/58 | Weiss | 323—94 |
| 2,914,728 | 11/59 | Brophy | 324—45 |
| 3,082,507 | 3/63 | Kuhrt et al. | 307—88.5 |

OTHER REFERENCES

Publication: Spencer-Kennedy Laboratories Inc., Bulletin DC400–1, Cambridge, Mass. (1955).

HERMAN KARL SAALBACH, *Primary Examiner.*

BENNETT G. MILLER, ELI J. SAX, *Examiners.*